US012394218B2

(12) United States Patent
Yu

(10) Patent No.: US 12,394,218 B2
(45) Date of Patent: Aug. 19, 2025

(54) METHOD AND APPARATUS FOR GENERATING LANE LINE, VEHICLE, STORAGE MEDIUM AND CHIP

(71) Applicant: Xiaomi EV Technology Co., Ltd., Beijing (CN)

(72) Inventor: Kun Yu, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 352 days.

(21) Appl. No.: 17/990,712

(22) Filed: Nov. 20, 2022

(65) Prior Publication Data

US 2023/0410535 A1     Dec. 21, 2023

(30) Foreign Application Priority Data

Jun. 17, 2022   (CN) .......................... 202210688142.6

(51) Int. Cl.
*G06V 20/56*     (2022.01)
*G06T 17/00*     (2006.01)

(52) U.S. Cl.
CPC ............ *G06V 20/588* (2022.01); *G06T 17/00* (2013.01); *G06T 2215/16* (2013.01)

(58) Field of Classification Search
CPC .... G06V 20/588; G06V 10/143; G06V 10/24; G06V 10/457; G06V 10/761;
(Continued)

(56) References Cited

U.S. PATENT DOCUMENTS

2019/0163989 A1    5/2019  Guo et al.
2019/0205665 A1*   7/2019  Duan ................... G06V 20/588
(Continued)

FOREIGN PATENT DOCUMENTS

CN       108470159 A       8/2018
CN       112733812 A   *   4/2021    ......... G06K 9/00798
(Continued)

OTHER PUBLICATIONS

Lu, Z., et al., "A Lane Detection Method Based on a Ridge Detector and Regional G-RANSAC", Sep. 18, 2019, Sensors 19(18). (Year: 2019).*

(Continued)

*Primary Examiner* — Molly Wilburn
*Assistant Examiner* — Emma N. Luke
(74) *Attorney, Agent, or Firm* — Volpe Koenig

(57) ABSTRACT

A method for generating a lane line, and includes: acquiring three-dimensional point cloud data and two-dimensional lane line data of a target lane, the two-dimensional lane line data being lane line data collected in response to determining that the vehicle is driving in the target lane, and the three-dimensional point cloud data being point cloud data of the surrounding environment of the vehicle collected in response to determining that the vehicle is driving in the target lane; determining a plurality of lane line key points according to the two-dimensional lane line data and the three-dimensional point cloud data; and obtaining a target three-dimensional lane line by connecting the plurality of lane line key points randomly for many times according to attribute information of the plurality of lane line key points and a driving direction of the vehicle.

16 Claims, 9 Drawing Sheets

(58) Field of Classification Search
CPC ...... G06V 20/647; G06V 10/30; G06V 10/80;
G06V 20/64; G06T 17/00; G06T
2215/16; G06T 7/73; G06T 2207/30256
See application file for complete search history.

(56) References Cited

U.S. PATENT DOCUMENTS

| | | | |
|---|---|---|---|
| 2020/0249684 | A1 | 8/2020 | Onofrio et al. |
| 2021/0063200 | A1* | 3/2021 | Kroepfl ................. G01S 13/931 |
| 2022/0091274 | A1 | 3/2022 | Kim et al. |

FOREIGN PATENT DOCUMENTS

| | | | |
|---|---|---|---|
| CN | 112926548 A | 6/2021 | |
| CN | 113465615 A | 10/2021 | |
| CN | 114549286 A | 5/2022 | |

OTHER PUBLICATIONS

Hong Mingjia, Wang Huilan, Huang Najun, et al., "A Lane Detection Algorithm Based on FCN", journal, Oct. 22, 2018, Radio Communications Technology, Type-A.

Extended European Search Report issued on Jun. 16, 2023 for European Patent Application No. 22210246.9.

* cited by examiner

METHOD AND APPARATUS FOR GENERATING LANE LINE, VEHICLE, STORAGE MEDIUM AND CHIP

CROSS REFERENCE TO RELATED APPLICATIONS

The disclosure is provided based on and claims the priority to the Chinese Patent Application No. 2022106881426, filed on Jun. 17, 2022, the entire contents of which are incorporated herein by reference.

BACKGROUND

In order to ensure the driving safety of automatic drive vehicles, the automatic drive vehicles usually have a function of detecting lane lines. The generation of a three-dimensional lane line is of great significance for the stable and safe driving of the automatic drive vehicles on the expressway. At present, two-dimensional lane lines detected on two-dimensional images are usually projected into a three-dimensional space to obtain three-dimensional lane lines, which are used as truth values to train neural network models and generate the three-dimensional lane lines through the neural network models during vehicle driving.

However, the two-dimensional lane lines may be detected by mistake, resulting in inconsistent types of projection points after two-dimensional images of adjacent frames are projected onto the three-dimensional ground, and the obtained lane lines may be broken or disconnected, which makes an accuracy of the generated three-dimensional lane lines relatively low.

SUMMARY

According to a first aspect of the example of the disclosure, a method for generating a lane line is provided, and includes:
  acquiring three-dimensional point cloud data and two-dimensional lane line data of a target lane, where the two-dimensional lane line data is lane line data collected in response to determining that a vehicle is driving in the target lane, and the three-dimensional point cloud data is point cloud data of a surrounding environment of the vehicle collected in response to determining that the vehicle is driving in the target lane;
  determining a plurality of lane line key points according to the two-dimensional lane line data and the three-dimensional point cloud data; and
  obtaining a target three-dimensional lane line by connecting the plurality of lane line key points randomly for many times according to attribute information of the plurality of lane line key points and a driving direction of the vehicle.

According to a second aspect of the example of the disclosure, a vehicle is provided, and includes:
  a processor, and
  a memory, configured to store processor-executable instructions.

The processor is configured to acquire three-dimensional point cloud data and two-dimensional lane line data of a target lane, where the two-dimensional lane line data is lane line data collected in response to determining that the vehicle is driving in the target lane, and the three-dimensional point cloud data is point cloud data of a surrounding environment of the vehicle collected in response to determining that the vehicle is driving in the target lane; determine a plurality of lane line key points according to the two-dimensional lane line data and the three-dimensional point cloud data; and obtain a target three-dimensional lane line by connecting the plurality of lane line key points randomly for many times according to attribute information of the plurality of lane line key points and a driving direction of the vehicle.

According a third aspect of the example of the disclosure, a non-transitory computer-readable storage medium is provided and stores computer program instructions, and the program instructions, when executed by a processor, implement steps of the method for generating the lane line provided by the first aspect of the disclosure.

According to a fourth aspect of the example of the disclosure, a chip is provided, and includes a processor and an interface, and the processor is configured to read instructions, so as to execute the method for generating the lane line provided by the first aspect of the disclosure.

It is to be understood that the above general descriptions and later detailed descriptions are merely explanatory and illustrative, and cannot limit the disclosure.

BRIEF DESCRIPTION OF THE DRAWINGS

The accompanying drawings here are incorporated into the specification and constitute a part of the specification, showing examples consistent with the disclosure, and are used together with the specification to explain the principle of the disclosure.

DETAILED DESCRIPTION

Figure 1:
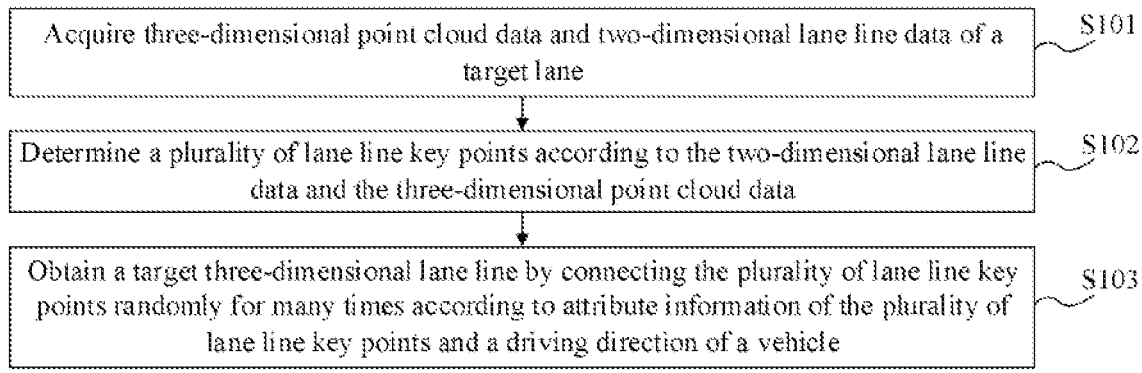
FIG. 1 is a flow chart of a method for generating a lane line illustrated according to an example of the disclosure.

Examples will be described in detail here, and instances are shown in the accompanying drawings. When the following description refers to the accompanying drawings, unless otherwise indicated, the same numbers in different accompanying drawings indicate the same or similar elements. The implementations described in the following examples do not represent all implementations consistent with the disclosure. Rather, they are merely instances of apparatuses and methods consistent with some aspects of the disclosure as detailed in the appended claims.

It needs to be illustrated that, all actions of acquiring signals, information or data in the disclosure are carried out under the premise of complying with the corresponding data protection laws and policies of the country where they are located, and with the authorization of the corresponding apparatus owner.

The disclosure relates to the technical field of automatic drive, in particular to a method and apparatus for generating a lane line, a vehicle, a storage medium and a chip.

First, an application scenario of the disclosure is described. At present, based on a way of generating a three-dimensional lane line through a neural network model, an accuracy of the neural network model directly affects an accuracy of the generated three-dimensional lane line. In the related art, two-dimensional images collected when a vehicle is driving in a historical period are collected to obtain a training sample, then two-dimensional lane lines detected on the two-dimensional images are projected into a three-dimensional space to obtain a three-dimensional lane line, which is used as a truth value for training the neural network, and the neural network model is obtained through the training sample and the truth value training. However, the two-dimensional lane lines may be detected by mistake, resulting in inconsistent types of obtained projection points and confusion of dotted lines and solid lines after the two-dimensional images of adjacent frames are projected onto the three-dimensional ground. In this case, the obtained three-dimensional lane line may be broken or connected by mistake. In this way, when the truth value for training the neural network model is inaccurate, the accuracy of the neural network model obtained by training is also low, resulting in a low accuracy of the three-dimensional lane line generated through the neural network model.

In order to overcome the technical problems existing in the above related art, the disclosure provides a method and apparatus for generating a lane line, a vehicle, a storage medium and a chip, after determining a plurality of lane line key points, attribute information of the lane line key points and a driving direction of a vehicle can be combined to obtain a target three-dimensional lane line. In this way, situations of broken line or wrong connection of the lane line can be reduced, so that the accuracy of the generated three-dimensional lane line is improved.

The disclosure is described below in conjunction with specific examples.

FIG. 1 is a flow chart of a method for generating a lane line illustrated according to an example of the disclosure. As shown in FIG. 1, the method may include:

S101, three-dimensional point cloud data and two-dimensional lane line data of a target lane are acquired.

The two-dimensional lane line data is lane line data collected in response to determining that a vehicle is driving in the target lane, and the three-dimensional point cloud data is point cloud data of a surrounding environment of the vehicle collected in response to determining that the vehicle is driving in the target lane.

In this step, in a process that the vehicle is driving in the target lane, two-dimensional lane line data corresponding to the lane line may be collected through a camera on the vehicle, and point cloud data of the surrounding environment of the vehicle is collected through a laser radar on the vehicle, so as to obtain the three-dimensional point cloud data.

S102, a plurality of lane line key points are determined according to the two-dimensional lane line data and the three-dimensional point cloud data.

In this step, after obtaining the three-dimensional point cloud data and the two-dimensional lane line data of the target lane, a ground plane corresponding to the target lane may be extracted from the three-dimensional point cloud data through a method of the prior art, and key points of a two-dimensional lane line detected in the two-dimensional lane line data are projected onto the ground plane according to parameters of the camera, so as to obtain a plurality of lane line key points.

S103, a target three-dimensional lane line is obtained by connecting the plurality of lane line key points randomly for many times according to attribute information of the plurality of lane line key points and a driving direction of the vehicle.

The attribute information may include a type, position information and a direction.

In this step, after determining the plurality of lane line key points, the plurality of lane line key points may be connected randomly for many times according to the attribute information of the plurality of lane line key points and the driving direction of the vehicle, a three-dimensional lane line is obtained after each random connection, and then, each three-dimensional lane line is scored, and the three-dimensional lane line with a highest score is taken as the target three-dimensional lane line.

By adopting the above method, after determining the plurality of lane line key points, the attribute information of the lane line key points and the driving direction of the vehicle can be combined to obtain the target three-dimensional lane line. In this way, situations of broken line or wrong connection of the lane line can be reduced, so that an accuracy of the generated three-dimensional lane line is improved.

Figure 2:
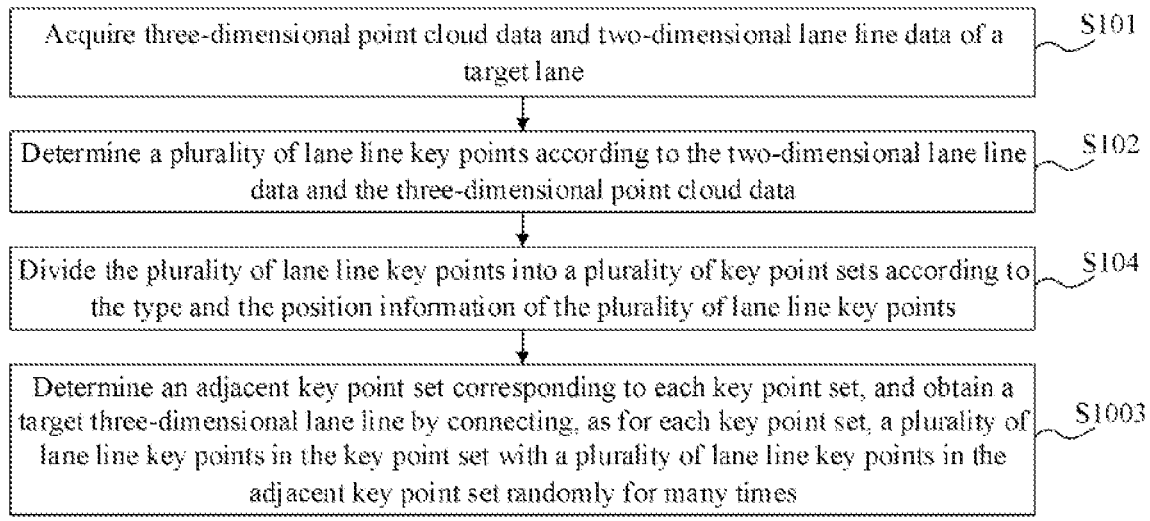
FIG. 2 is a flow chart of a second method for generating a lane line illustrated according to an example of the disclosure.

FIG. 2 is a flow chart of a second method for generating a lane line illustrated according to an example of the disclosure. As shown in FIG. 2, the method further may include:

S104, the plurality of lane line key points are divided into a plurality of key point sets according to the type and the position information of the plurality of lane line key points.

In this step, after determining the plurality of lane line key points, a preset set distance may be acquired, and according to the preset set distance, the plurality of lane line key points are divided into the plurality of key point sets according to the type and the position information of the plurality of lane line key points. For example, a plurality of initial lane line key points with the earliest collection time may be determined among the plurality of lane line key points first, the plurality of initial lane line key points are taken as a first key point set, then, as for each initial lane line key point, according to a type and position information of a plurality of first remaining lane line key points, first lane line key points with the preset set distance from the initial lane line key points and that are the same type as the initial lane line key points are determined from the plurality of first remaining lane line key points, the plurality of first lane line key points are taken as a second key point set, and the first remaining lane line key points may include lane line key points except for the plurality of initial lane line key points among the plurality of lane line key points. The preset set distance may be obtained by pre-testing according to a test, and for example, the preset set distance may be 5 meters.

Further, the plurality of first lane line key points may be taken as new initial lane line key points, according to the above method for determining the first lane line key points, a plurality of second lane line key points are determined from a plurality of second remaining lane line key points, the second remaining lane line key points include lane line key points except for the plurality of first lane line key points among the plurality of first remaining lane line key points, and the plurality of second lane line key points are taken as a third key point set. By parity of reasoning, the plurality of lane line key points are continuously divided according to the above method, and finally a plurality of key point sets are obtained, which will not be repeated here.

Accordingly, step S103 may be:

S1003, an adjacent key point set corresponding to each key point set is determined, and as for each key point set, the target three-dimensional lane line is obtained by connecting a plurality of lane line key points in the key point set with a plurality of lane line key points in the adjacent key point set randomly for many times.

Figure 3:
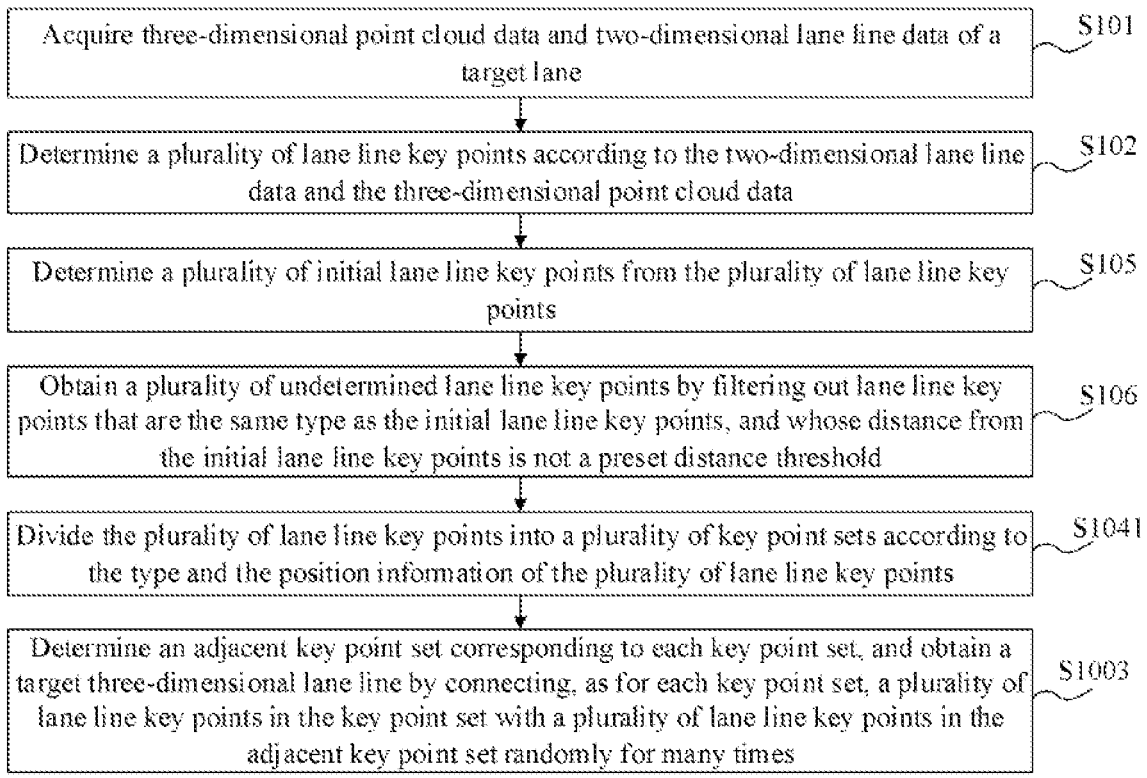
FIG. 3 is a flow chart of a third method for generating a lane line illustrated according to an example of the disclosure.

FIG. 3 is a flow chart of a third method for generating a lane line illustrated according to an example of the disclosure. As shown in FIG. 3, the method further may include:

S105, a plurality of initial lane line key points are determined from the plurality of lane line key points.

S106, a plurality of undetermined lane line key points are obtained by filtering out lane line key points that are the same type as the initial lane line key points, and whose distance from the initial lane line key points is not a preset distance threshold.

The preset distance threshold may be an integral multiple of a preset distance, and the preset distance may be preset according to experience, for example, may be 1 meter or 5 meters.

For example, after determining the plurality of initial lane line key points, a plurality of undetermined lane line key points that are the same type as the initial lane line key points and whose distance from the initial lane line key points is the preset distance, a 2-time preset distance, a 3-time preset distance, . . . an N-time preset distance may be determined from the plurality of lane line key points, where N may be determined according to the lane line key point farthest from the initial lane line key points. In this way, lane line key points with similar distance and the same type among the plurality of lane line key points may be filtered out, such that the undetermined lane line key points after duplicate removal are more accurate, and the accuracy of the generated three-dimensional lane line is further improved.

Accordingly, step S104 may be:

S1041, the plurality of undetermined lane line key points are divided into a plurality of key point sets according to the type and the position information of the plurality of undetermined lane line key points.

Figure 4:
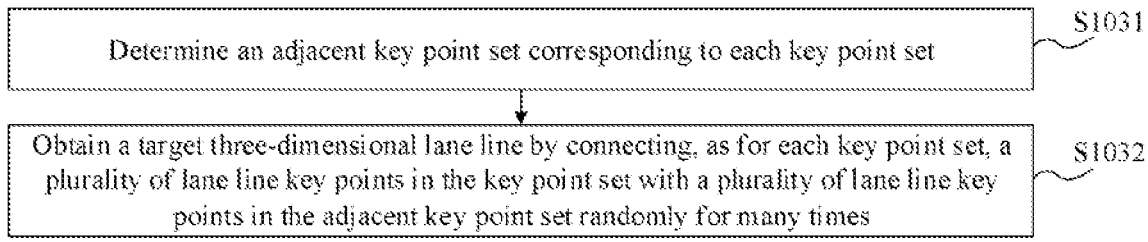
FIG. 4 is a flow chart of a fourth method for generating a lane line illustrated according to an example of the disclosure.

Based on the example shown in FIG. 2, FIG. 4 is a flow chart of a fourth method for generating a lane line illustrated according to an example of the disclosure. As shown in FIG. 4, step S103 may include:

S1031, an adjacent key point set corresponding to each key point set is determined.

In this step, after obtaining the plurality of key point sets, as for each key point set, the adjacent key point set corresponding to the key point set may be determined. Continuing to explain with the instance in step S104 as an example, as for a first key point set, an adjacent key point set corresponding to the first key point set may be determined as a second key point set, and as for the second key point set, an adjacent key point set corresponding to the second key point set may be determined as a third key point set.

S1032, a target three-dimensional lane line is obtained by connecting, as for each key point set, a plurality of lane line key points in the key point set with a plurality of lane line key points in the adjacent key point set randomly for many times.

Figure 5:
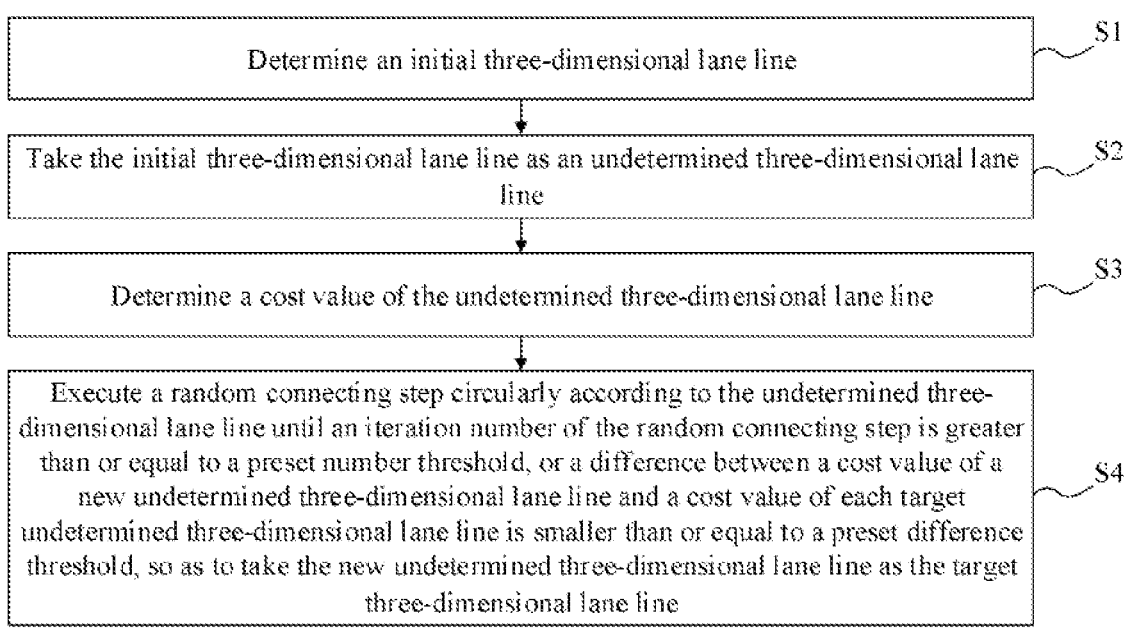
FIG. 5 is a flow chart of a fifth method for generating a lane line illustrated according to an example of the disclosure.

FIG. 5 is a flow chart of a fifth method for generating a lane line illustrated according to an example of the disclosure. As shown in FIG. 5, step S1032 may include:

S1, an initial three-dimensional lane line is determined.

In a possible implementation, as for each key point set, after the adjacent key point set corresponding to the key point set is determined, as for each lane line key point in the key point sets, target adjacent lane line key points closest to the lane line key point are determined from the adjacent key point sets, and the initial three-dimensional lane line is obtained by connecting the lane line key point with the target adjacent lane line key points.

Figure 6:
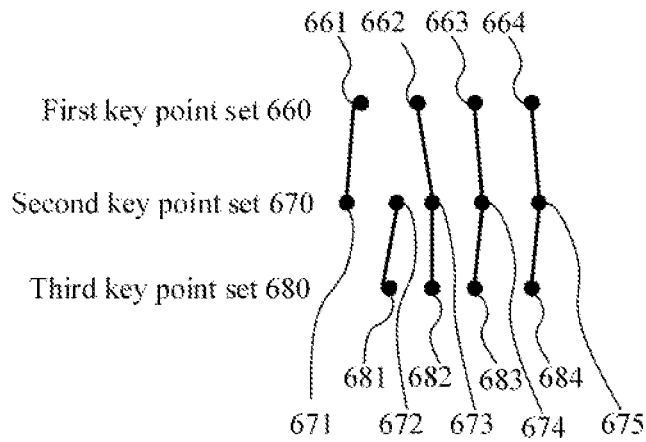
FIG. 6 is a schematic diagram of an initial three-dimensional lane line illustrated according to an example of the disclosure.

FIG. 6 is a schematic diagram of an initial three-dimensional lane line illustrated according to an example of the disclosure. As shown in FIG. 6, the key point sets include the first key point set 660 (comprising a first key point 661, a second key point 662, a third key point 663 and a fourth key point 664), the second key point set 670 and the third key point set 680, the adjacent key point set corresponding to the first key point set 660 is the second key point set 670, the adjacent key point set corresponding to the second key point set 670 is the third key point set 680, as for each lane line key point in the first key point set 660, target adjacent lane line key points closest to each lane line key point are determined from the second key point set 670, and the lane line key points are connected to the target adjacent lane line key points. As for the second key point set 670, the second key point set 670 includes five lane line key points (a first key point 671, a second key point 672, a third key point 673, a fourth key point 674 and a fifth key point 675 sequentially from left to right), the third key point set 680 includes four lane line key points (a first key point 681, a second key point 682, a third key point 683 and a fourth key point 684 sequentially from left to right), and the target adjacent lane line key points closest to the first key point 671 and the second key point 672 in the second key point set 670 are the first key point 681 in the third key point set 680. In this case, if the distance between the first key point 671 in the second key point set 670 and the first key point 681 in the third key point set 680 is less than the distance between the second key point 672 in the second key point set 670 and the first key point 681 in the third key point set 680, the second key point 672 in the second key point set 670 may be connected to the first key point 681 in the third key point set 680, as shown in FIG. 6, the second key point 672 in the second key point set 670 is connected to the first key point 681 in the third key point set, and the first key point 671 in the second key point set 670 is not connected to the first key point 681 in the third key point set 680.

S2, the initial three-dimensional lane line is taken as an undetermined three-dimensional lane line.

S3, a cost value of the undetermined three-dimensional lane line is determined.

In a possible implementation, as for each lane line key point of the undetermined three-dimensional lane line, key point cost value of the lane line key point is determined, and a sum value of the plurality of key point cost values is taken as the cost value of the undetermined three-dimensional lane line.

A direction cost value of the lane line key point may be determined according to the direction of the lane line key point and a direction of the adjacent lane line key point in the undetermined three-dimensional lane line connected to the lane line key point; a type cost value of the lane line key point is determined according to a type of the lane line key point and a type of the adjacent lane line key point; an included angle cost value of the lane line key point is determined according to the driving direction of the vehicle and a preset reference direction; a number of intermittent lane line key points in the undetermined three-dimensional lane line is determined; and the key point cost values are calculated according to a preset direction coefficient, a preset type coefficient, a preset included angle coefficient, a preset number coefficient, the direction cost value, the type cost value, the included angle cost value and the number.

For example, the key point cost value may be calculated by a formula (1):

$$\text{cost}=a*\text{cost1}+b*\text{cost2}+c*\text{cost3}+d*\text{cost4} \qquad (1),$$

where, cost is the key point cost value, a is the preset direction coefficient, b is the preset type coefficient, c is the preset included angle coefficient, d is the preset number coefficient, cost1 is the direction cost value, cost2 is the type cost value, cost3 is the included angle cost value, and cost4 is the number.

The direction cost value of the lane line key point may be calculated by a formula (2):

$$\text{cost1}=\text{orientation(node1)}-\text{orientation(node2)} \qquad (2),$$

where, orientation(node1) is the direction of the lane line key point, and orientation(node2) is the direction of the adjacent lane line key point connected to the lane line key point.

The type cost value of the lane line key point may be determined according to the type of the lane line key point and the type of the adjacent lane line key point connected to the lane line key point. For example, if the type of the lane line key point is the same as the type of the adjacent lane line key point connected to the lane line key point, the type cost value of the lane line key point may be determined as 0, and if the type of the lane line key point is different from the type of the adjacent lane line key point connected to the lane line key point, the type cost value of the lane line key point may be determined as 1.

The preset reference direction may be the direction of the lane line key point, and the included angle cost value of the lane line key point may be calculated by a formula (3):

$$\text{cost3}=\text{orientation(node1)}-\text{orientation(car)} \qquad (3),$$

where, orientation(car) is the driving direction of the vehicle.

It needs to be illustrated that, the preset reference direction may also be other preset directions (such as a true north direction), which is not limited in the disclosure.

Taking the initial three-dimensional lane line shown in FIG. 6 as an example, if the initial three-dimensional lane line is taken as the undetermined three-dimensional lane line, the number of the intermittent lane line key points in the undetermined three-dimensional lane line is 2 (the first key point and the second key point in the second key point set).

S4, a random connecting step is executed circularly according to the undetermined three-dimensional lane line until an iteration number of the random connecting step is greater than or equal to a preset number threshold, or a difference between a cost value of a new undetermined three-dimensional lane line and a cost value of each target undetermined three-dimensional lane line is smaller than or equal to a preset difference threshold, so as to take the new undetermined three-dimensional lane line as the target three-dimensional lane line.

The iteration number may be preset according to experience, for example, the iteration number may be 2000. The preset difference threshold may be obtained by pre-testing according to experience, for example, the preset difference threshold may be 0, that is, in a case that the preset number of undetermined three-dimensional lane lines acquired before the new undetermined three-dimensional lane line are all the same as the new undetermined three-dimensional lane line, iteration may be stopped. The preset number may be determined according to the preset number threshold, for example, the preset number may be 2% of the preset number threshold. The target undetermined three-dimensional lane line includes the preset number of undetermined three-dimensional lane lines acquired before the new undetermined three-dimensional lane line.

Figure 7:
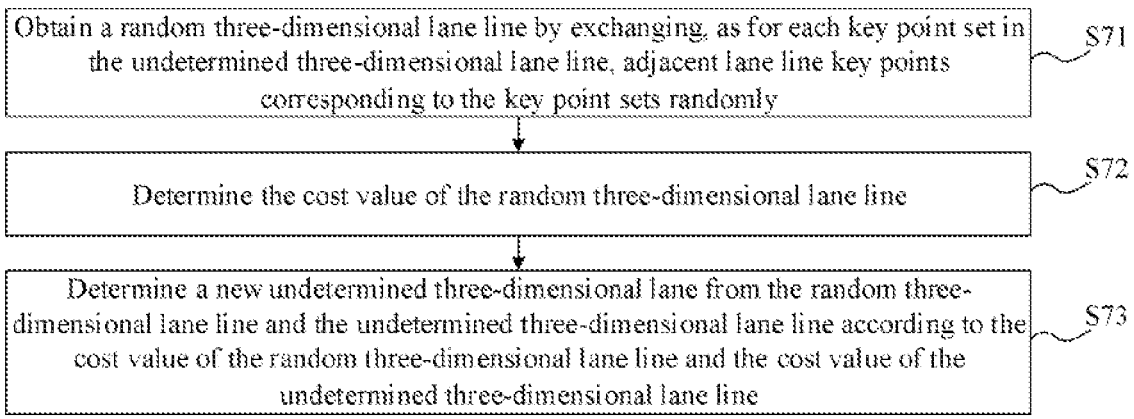
FIG. 7 is a flow chart of a random connecting step illustrated according to an example of the disclosure.

FIG. 7 is a flow chart of a random connecting step illustrated according to an example of the disclosure. As shown in FIG. 7, the random connecting step may include:

S71, a random three-dimensional lane line is obtained by exchanging, as for each key point set in the undetermined three-dimensional lane line, adjacent lane line key points corresponding to the key point sets randomly.

The adjacent lane line key points may include lane line key points in the adjacent key point set connected to the lane line key points in the key point set.

For example, continuing to take the initial three-dimensional lane line shown in FIG. 6 as an example, if the initial three-dimensional lane line is taken as the undetermined three-dimensional lane line, as for the second key point set in the undetermined three-dimensional lane line, the lane line key points in the third key point set connected to the third key point and the fourth key point in the second key point set may be exchanged, that is, the random three-dimensional lane line is obtained by connecting the second key point in the second key point set with the third key point in the third key point set, and connecting the third key point in the second key point set with the second key point in the third key point set.

S72, a cost value of the random three-dimensional lane line is determined.

In this step, the method for determining the cost value of the random three-dimensional lane line may refer to the method for determining the cost value of the undetermined three-dimensional lane line in step S3, which will not be repeated here.

S73, a new undetermined three-dimensional lane is determined from the random three-dimensional lane line and the undetermined three-dimensional lane line according to the cost value of the random three-dimensional lane line and the cost value of the undetermined three-dimensional lane line.

In this step, in a case that the cost value of the random three-dimensional lane line is smaller than or equal to the cost value of the undetermined three-dimensional lane line, the random three-dimensional lane line may be taken as the new undetermined three-dimensional lane line; and in a case that the cost value of the random three-dimensional lane line is greater than the cost value of the undetermined three-dimensional lane line, a cost value difference between the cost value of the random three-dimensional lane line and the cost value of the undetermined three-dimensional lane line may be determined, and the new undetermined three-dimensional lane line is determined from the random three-dimensional lane line and the undetermined three-dimensional lane line according to the cost value difference and the iteration number.

In a possible implementation, an acceptance coefficient may be determined according to the iteration number and a preset initial cost value, an acceptance probability is determined according to the cost value difference and the acceptance coefficient, in a case that the acceptance probability is greater than or equal to a preset probability threshold, the random three-dimensional lane line is taken as the new undetermined three-dimensional lane line, and in a case that the acceptance probability is smaller than the preset probability threshold, the undetermined three-dimensional lane line is taken as the new undetermined three-dimensional lane line. The preset probability threshold may be preset according to experience.

For example, a ratio of the preset initial cost value to the iteration number may be taken as the acceptance coefficient, and in a case that the cost value difference is greater than or equal to 0, the acceptance probability may be calculated by a formula (4):

$$P(accept)=\exp(-Tc/Ti) \quad (4),$$

where, P(accept) is the acceptance probability. Tc is the cost value difference, and Ti is the acceptance coefficient.

In a case that the cost value difference is smaller than 0, the acceptance probability may be determined as a preset probability, for instance, the preset probability may be 1.

Figure 8:
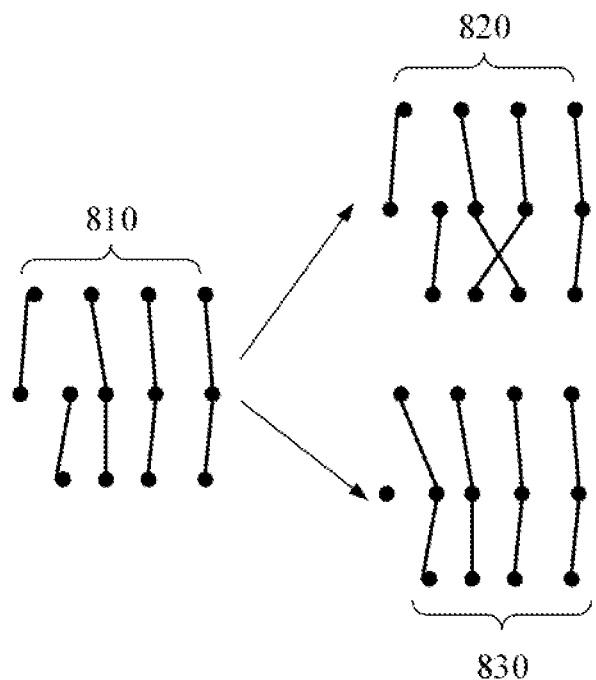
FIG. 8 is a schematic diagram of charge of a cost value illustrated according to an example of the disclosure.

FIG. 8 is a schematic diagram of change of a cost value illustrated according to an example of the disclosure. As shown in FIG. 8, on the left side, a three-dimensional lane line 810 is an undetermined three-dimensional lane line, on the upper right side, a three-dimensional lane line 820 is a random three-dimensional lane line, a cost value of the random three-dimensional lane line 820 on the upper right side is 100, a cost value of the random three-dimensional lane line 830 on the lower right side is 10, and it can be seen from FIG. 8 that the random three-dimensional lane 830 line on the lower right side is better.

The acceptance probability is calculated through the above random method, the non-optimal three-dimensional lane line may be taken as a new undetermined three-dimensional lane line randomly, the random connecting step is executed, in this way, some three-dimensional lane lines with low cost values can be prevented from being omitted in a subsequent iteration process, and thus the accuracy of the generated three-dimensional lane line is further improved.

To sum up, after determining the plurality of lane line key points, the initial three-dimensional lane line is determined and taken as the undetermined three-dimensional lane line, the random connecting step is executed according to the undetermined three-dimensional lane line to obtain the random three-dimensional lane line, the cost value of the random three-dimensional lane line is determined, in a case that the cost value of the random three-dimensional lane line is smaller than or equal to the cost value of the undetermined three-dimensional lane line, the random three-dimensional lane line is taken as the new undetermined three-dimensional lane line, the random connecting step is continuously executed, in a case that the cost value of the random three-dimensional lane line is greater than the cost value of the undetermined three-dimensional lane line, the random connecting step is continuously executed according to the undetermined three-dimensional lane line until the iteration number of the random connecting step is greater than or equal to the preset number threshold, or the difference between the cost value of the new undetermined three-dimensional lane line and the cost value of each target undetermined three-dimensional lane line is smaller than or equal to the preset difference threshold. In this way, after each iteration, subsequent iterations may be carried out based on the optimal three-dimensional lane line, and the best three-dimensional lane line may be obtained finally, which further improves the accuracy of the generated three-dimensional lane line.

Figure 9:
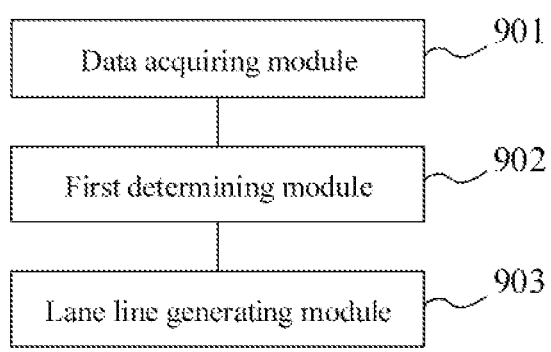
FIG. 9 is a block diagram of an apparatus for generating a lane line illustrated according to an example of the disclosure.

FIG. 9 is a block diagram of an apparatus for generating a lane line illustrated according to an example of the disclosure. As shown in FIG. 9, the apparatus may include:

a data acquiring module 901, configured to acquire three-dimensional point cloud data and two-dimensional lane line data of a target lane, where the two-dimensional lane line data is lane line data collected in response to determining that a vehicle is driving in a target lane, and the three-dimensional point cloud data is point cloud data of a surrounding environment of the vehicle collected in response to determining that the vehicle is driving in the target lane;

a first determining module 902, configured to determine a plurality of lane line key points according to the two-dimensional lane line data and the three-dimensional point cloud data; and a lane line generating module 903, configured to obtain a target three-dimensional lane line by connecting the plurality of lane line key points randomly for many times according to attribute information of the plurality of lane line key points and a driving direction of the vehicle.

Figure 10:
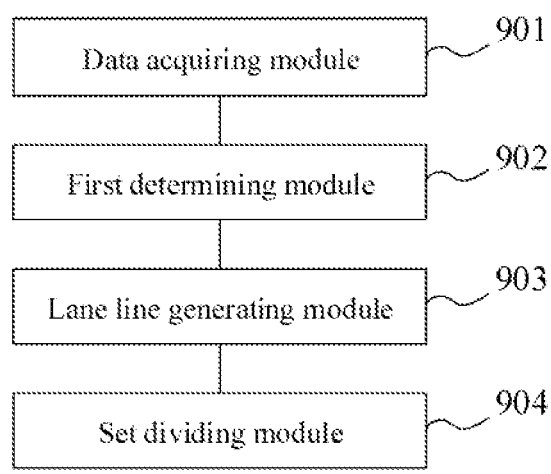
FIG. 10 is a block diagram of a second apparatus for generating a lane line illustrated according to an example of the disclosure.

In an example, the attribute information includes a type and position information. FIG. 10 is a block diagram of a second apparatus for generating a lane line illustrated according to an example of the disclosure. As shown in FIG. 10, the apparatus further includes:

a set dividing module 904, configured to divide the plurality of lane line key points into a plurality of key point sets according to the type and the position information of the plurality of lane line key points.

The lane line generating module 903 is further configured to:

determine an adjacent key point set corresponding to each key point set;

obtain the target three-dimensional lane line by connecting, as for each key point set, a plurality of lane line key points in the key point set with a plurality of lane line key points in the adjacent key point set randomly for many times.

In an example, the lane line generating module 903 is further configured to:

determine an initial three-dimensional lane line;

take the initial three-dimensional lane line as an undetermined three-dimensional lane line;

determine a cost value of the undetermined three-dimensional lane line; and execute a random connecting step circularly according to the undetermined three-dimensional lane line until an iteration number of the random connecting step is greater than or equal to a preset number threshold, or a difference between a cost value of a new undetermined three-dimensional lane line and a cost value of each target undetermined three-dimensional lane line is smaller than or equal to a preset difference threshold, so as to take the new undetermined three-dimensional lane line as the target three-dimensional lane line, where the target undetermined three-dimensional lane line includes a preset number of undetermined three-dimensional lane lines acquired before the new undetermined three-dimensional lane line.

The random connecting step includes:

a random three-dimensional lane line is obtained by exchanging, as for each key point set in the undetermined three-dimensional lane line, adjacent lane line key points corresponding to the key point sets randomly, where the adjacent lane line key points include lane line key points in the adjacent key point sets connected to lane line key points in the key point sets;

a cost value of the random three-dimensional lane line is determined; and a new undetermined three-dimensional lane is determined from the random three-dimensional lane line and the undetermined three-dimensional lane line according to the cost value of the random three-dimensional lane line and the cost value of the undetermined three-dimensional lane line.

In an example, the lane line generating module 903 is further configured to:

determine, as for each lane line key point in the key point sets, target adjacent lane line key points closest to the lane line key point from the adjacent key point sets, and obtain the initial three-dimensional lane line by connecting the lane line key point with the target adjacent lane line key points.

In an example, the lane line generating module 903 is further configured to:

determine, as for each lane line key point of the undetermined three-dimensional lane line, key point cost value of the lane line key point; and take a sum value of the plurality of key point cost values as the cost value of the undetermined three-dimensional lane line.

In an example, the attribute information further includes a direction, and the lane line generating module 903 is further configured to:

determine a direction cost value of the lane line key point according to the direction of the lane line key point and a direction of the adjacent lane line key point in the undetermined three-dimensional lane line connected to the lane line key point;

determine a type cost value of the lane line key point according to a type of the lane line key point and a type of the adjacent lane line key point;

determine an included angle cost value of the lane line key point according to the driving direction of the vehicle and a preset reference direction;

determine a number of intermittent lane line key points in the undetermined three-dimensional lane line; and calculate the key point cost values according to a preset direction coefficient, a preset type coefficient, a preset included angle coefficient, a preset number coefficient, the direction cost value, the type cost value, the included angle cost value and the number.

In an example, the lane line generating module 903 is further configured to:

take the random three-dimensional lane line as the new undetermined three-dimensional lane line in a case that the cost value of the random three-dimensional lane line is smaller than or equal to the cost value of the undetermined three-dimensional lane line; and determine a cost value difference between the cost value of the random three-dimensional lane line and the cost value of the undetermined three-dimensional lane line in a case that the cost value of the random three-dimensional lane line is greater than the cost value of the undetermined three-dimensional lane line, and determine the new undetermined three-dimensional lane line from the random three-dimensional lane line and the undetermined three-dimensional lane line according to the cost value difference and the iteration number.

In an example, the lane line generating module 903 is further configured to:

determine an acceptance coefficient according to the iteration number and a preset initial cost value;

determine an acceptance probability according to the cost value difference and the acceptance coefficient;

take the random three-dimensional lane line as the new undetermined three-dimensional lane line in a case that the acceptance probability is greater than or equal to a preset probability threshold; and take the undetermined three-dimensional lane line as the new undetermined three-dimensional lane line in a case that the acceptance probability is smaller than the preset probability threshold.

Figure 11:
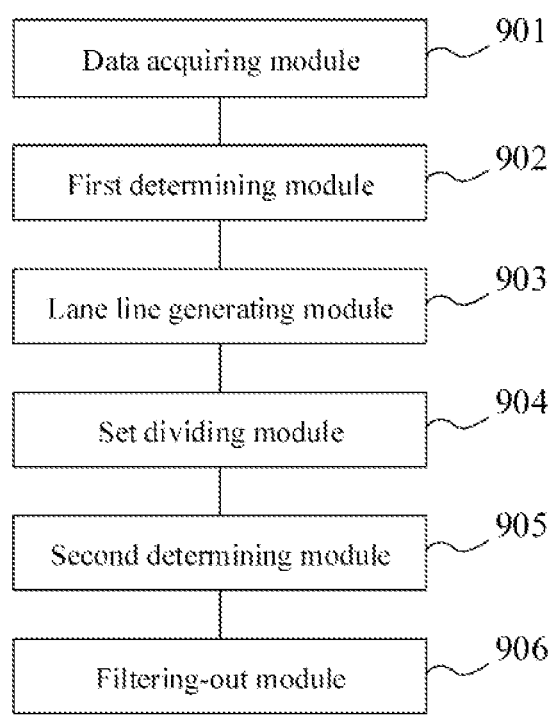
FIG. 11 is a block diagram of a third apparatus for generating a lane line illustrated according to an example of the disclosure.

In an example, FIG. 11 is a block diagram of a third apparatus for generating a lane line illustrated according to an example of the disclosure. As shown in FIG. 11, the apparatus further includes:

a second determining module 905, configured to determine a plurality of initial lane line key points from the plurality of lane line key points; and a filtering-out module 906, configured to obtain a plurality of undetermined lane line key points by filtering out lane line key points that are the same type as the initial lane line key points, and whose distance from the initial lane line key points is not a preset distance threshold, where the preset distance threshold is an integral multiple of a preset distance.

The set dividing module 904 is further configured to:

divide the plurality of undetermined lane line key points into a plurality of key point sets according to the type and the position information of the plurality of undetermined lane line key points.

Through the above apparatus, after determining the plurality of lane line key points, the attribute information of the lane line key points and the driving direction of the vehicle can be combined to obtain the target three-dimensional lane line. In this way, situations of broken line or wrong connection of the lane line can be reduced, so that an accuracy of the generated three-dimensional lane line is improved.

As for the apparatus in the above examples, the specific manner in which each module performs operations has been described in detail in the examples of the method, and detailed description will not be given here.

The disclosure further provides a non-transitory computer-readable storage medium, storing computer program instructions, and the program instructions, when executed by a processor, implement steps of the method for generating the lane line provided by the disclosure.

In addition to being an independent electronic device, the above apparatus may also be a part of the independent electronic device. For instance, in an example, the apparatus may be an integrated circuit (IC) or a chip. The integrated circuit may be one IC or an integration of a plurality of ICs. The chip may include, but not limited to the following types: a graphics processing unit (GPU), a central processing unit (CPU), a field programmable gate array (FPGA), a digital signal processor (DSP), an application specific integrated circuit (ASIC), a system on chip (SoC), etc. The above integrated circuit or chip may be configured to execute executable instructions (or codes) to implement the above method for generating the lane line. The executable instructions may be stored in the integrated circuit or the chip, or acquired from other apparatuses or devices, for instance, the integrated circuit or the chip includes a processor, a memory and an interface for communication with other apparatuses. The executable instructions may be stored in the processor, and implement, when executed by the processor, the above method for generating the lane line; or the integrated circuit or the chip may receive the executable instructions through the interface and transmit the executable instructions to the processor for executing, so as to implement the above method for generating the lane line.

Figure 12:
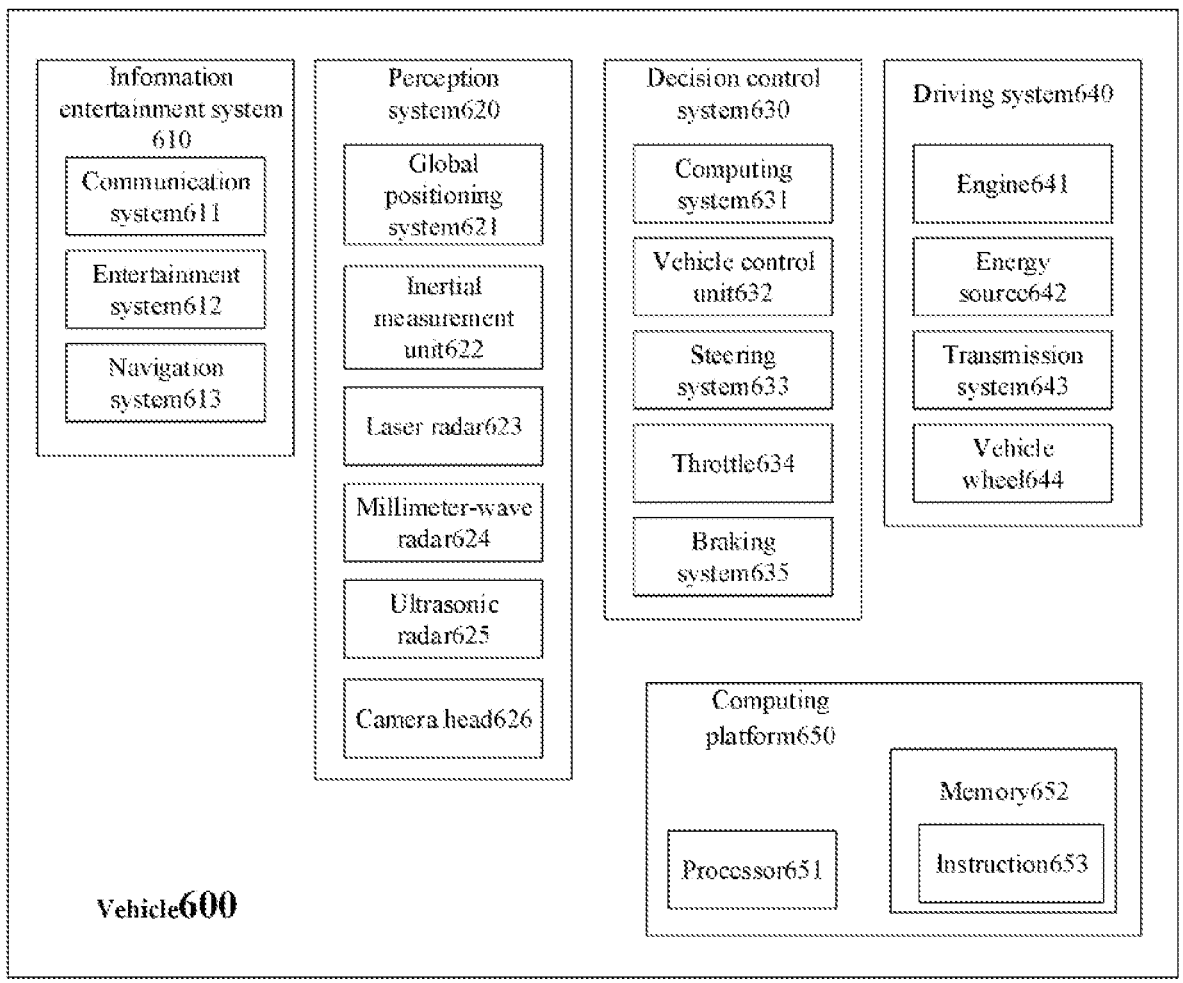
FIG. 12 is a schematic functional block diagram of a vehicle illustrated by an example.

Referring to FIG. 12, which is a schematic functional block diagram of a vehicle 600 illustrated by an example. The vehicle 600 may be configured as a full or partial automatic drive mode. For instance, the vehicle 600 may acquire its surrounding environment information through a perception system 620, and obtain an automatic drive strategy based on the analysis of the surrounding environment information to realize full automatic drive, or present an analysis result to a user to realize partial automatic drive.

The vehicle 600 may include various subsystems, such as an information entertainment system 610, the perception system 620, a decision control system 630, a driving system 640 and a computing platform 650. In an example, the vehicle 600 may include more or less subsystems, and each subsystem may include a plurality of components. In addition, each subsystem and component of the vehicle 600 may be interconnected by wired or wireless means.

In some examples, the information entertainment system 610 may include a communication system 611, an entertainment system 612 and a navigation system 613.

The communication system 611 may include a wireless communication system, and the wireless communication system may be in wireless communication with one or more devices directly or via a communication network. For instance, the wireless communication system may use 3G cellular communication, such as CDMA, EVD0, GSM/GPRS, or 4G cellular communication, such as LTE, or 5G cellular communication. The wireless communication system may be in communication with a wireless local area network (WLAN) by using WiFi. In some examples, the wireless communication system may be in communication with devices directly by using an infrared link, Bluetooth® or ZigBee. Other wireless protocols, such as various vehicle communication systems, for instance, the wireless communication system may include one or more dedicated short range communications (DSRC) devices, which may include public and/or private data communications between vehicles and/or roadside stations.

The entertainment system 612 may include a display device, a microphone and a stereo, and the user may listen to the radio and play music in the vehicle based on the entertainment system; or connect a mobile phone with the vehicle to realize screen projection of the mobile phone on the display device, the display device may be touch sensitive, and the user may operate by touching a screen.

In some cases, voice signals of the user may be acquired through the microphone, and some control on the vehicle 600 by the user is realized based on the analysis of the voice signals of the user, such as adjustment of a temperature in the vehicle. In some other cases, music may be played to the user through the stereo.

The navigation system 613 may include a map service provided by a map supplier to provide the navigation of a driving route for the vehicle 600, and the navigation system 613 may be used together with a global positioning system 621 and an inertial measurement unit 622 of the vehicle. The map service provided by the map supplier may be a two-dimensional map or a high-precision map.

The perception system 620 may include several types of sensors that sense information about the surrounding environment of the vehicle 600. For instance, the perception system 620 may include the global positioning system 621 (the global positioning system may be a GPS system, a Beidou system or other positioning systems), the inertial measurement unit (IMU) 622, a laser radar 623, a millimeter-wave radar 624, an ultrasonic radar 625 and a camera head 626. The perception system 620 may further include sensors for monitoring internal systems of the vehicle 600 (such as an interior air quality monitor, a fuel gauge, and an oil temperature gauge). Sensor data from one or more of these sensors may be used to detect an object and its corresponding characteristics (a position, a shape, a direction, a speed, etc.). Detection and recognition are key functions of the safe operation of the vehicle 600.

The global positioning system 621 is configured to estimate a geographic location of the vehicle 600.

The inertial measurement unit 622 is configured to sense the location and attitude change of the vehicle 600 based on an inertial acceleration. In some examples, the inertial measurement unit 622 may be a combination of an accelerator and a gyroscope.

The laser radar 623 uses a laser to sense objects in the environment where the vehicle 600 is located. In some examples, the laser radar 623 may include one or more laser sources, a laser scanner, one or more detectors, and other system components.

The millimeter-wave radar 624 uses radio signals to sense objects in the surrounding environment of the vehicle 600. In some examples, in addition to sensing the objects, the millimeter-wave radar 624 may further be configured to sense the speed and/or heading direction of the objects.

The ultrasonic radar 625 may uses ultrasonic signals to sense objects around the vehicle 600.

The camera head 626 is configured to capture image information of the surrounding environment of the vehicle 600. The camera head 626 may include a monocular camera, a binocular camera, a structured light camera, a panoramic camera and the like, and the image information acquired by the camera head 626 may include a still image or video stream information.

The decision control system 630 includes the computing system 631 that carries out analysis and makes decisions based on the information acquired by the perception system 620. The decision control system 630 further includes a vehicle control unit 632 that controls a power system of the vehicle 600, and a steering system 633, a throttle 634 and a braking system 635 which are configured to control the vehicle 600.

The computing system 631 may operate to process and analyze various information acquired by the perception system 620, so as to recognize targets, objects and/or features in the surrounding environment of the vehicle 600. The targets may include pedestrians or animals, and the objects and/or the features may include traffic signals, road boundaries and obstacles. The computing system 631 may use an object recognition algorithm, a structure from motion (SFM) algorithm, video tracking and other technologies. In some examples, the computing system 631 may be configured to map the environment, track objects, estimate the speed of objects and the like. The computing system 631 may analyze the acquired various information and obtain a control strategy for the vehicle.

The vehicle control unit 632 may be configured to coordinate and control a power battery and an engine 641 of the vehicle, so as to improve a power performance of the vehicle 600.

The steering system 633 may operate to adjust the heading direction of the vehicle 600. For instance, in one example, it may be a steering wheel system.

The throttle 634 is configured to control an operation speed of the engine 641 and then control the speed of the vehicle 600.

The braking system 635 is configured to control the vehicle 600 to decelerate. The braking system 635 may use friction to slow down vehicle wheels 644. In some examples, the braking system 635 may convert kinetic energy of the vehicle wheels 644 into currents. The braking system 635 may also adopt other manners to reduce the rotation speed of the vehicle wheels 644, so as to control the speed of the vehicle 600.

The driving system 640 may include components that provide power movement for the vehicle 600. In one example, the driving system 640 may include the engine 641, an energy source 642, a transmission system 643 and the vehicle wheels 644. The engine 641 may be an internal combustion engine, an electric motor, an air compression engine or other types of engine combinations, such as a hybrid engine consisting of a gasoline engine and the electric motor, and a hybrid engine consisting of the internal combustion engine and the air compression engine. The engine 641 converts the energy source 642 into mechanical energy.

Instances of the energy sources 642 include gasoline, diesel, other petroleum-based fuels, propane, other compressed-gas-based fuels, ethanol, solar panels, batteries and other power sources. The energy source 642 may also provide energy for other systems of the vehicle 600.

The transmission system 643 may transmit mechanical power from the engine 641 to the vehicle wheels 644. The transmission system 643 may include a gearbox, a differential and a drive shaft. In one example, the transmission system 643 may further include other devices, such as a clutch. The drive shaft may include one or more shafts that may be coupled to one or more vehicle wheels 644.

Some or all functions of the vehicle 600 are controlled by the computing platform 650. The computing platform 650 may include at least one processor 651, and the processor 651 may execute instructions 653 stored in a non-transitory computer-readable storage medium such as a memory 652. In some examples, the computing platform 650 may further be a plurality of computing devices that control individual components or subsystems of the vehicle 600 in a distributed manner.

The processor 651 may be any conventional processor, such as a commercially available CPU. Alternatively, the processor 651 may further include a graphic process unit (GPU), a field programmable gate array (FPGA), a system on chip (SOC), an application specific integrated circuit (ASIC) or their combinations. Although FIG. 12 functionally illustrates the processor, the memory, and other elements of a computer in the same block, those skilled in the art should understand that the processor, the computer or the memory actually may include a plurality of processors, computers or memories that may or may not be stored in a same physical shell. For instance, the memory may be a hard disk drive or other storage mediums located in a shell different from the computer. Hence, a reference to the processor or the computer will be understood to include a reference to a set of processors or computers or memories that may or may not operate in parallel. Unlike using a single processor to execute the steps described here, some components such as steering components and deceleration components may each have their own processors, and the processors merely execute computing related to component specific functions.

In an implementation of the disclosure, the processor 651 may execute the above method for generating the lane line.

In various aspects described here, the processor 651 may be located away from the vehicle and in wireless communication with the vehicle. In other aspects, some of the processes described here are executed on the processors arranged in the vehicle, and others are executed by a remote processor, including adopting necessary steps to execute a single manipulation.

In some examples, the memory 652 may include the instructions 653 (such as program logic) that may be executed by the processor 651 to execute various functions of the vehicle 600. The memory 652 may also include additional instructions, including instructions to send data to one or more of the information entertainment system 610, the perception system 620, the decision control system 630, and the driving system 640, receive data from them, interact with them and/or control them.

In addition to the instructions 653, the memory 652 may further store data, such as road maps, route information, vehicle location, direction, speed and other such vehicle data, and other information. This information may be used by the vehicle 600 and the computing platform 650 during operation of the vehicle 600 in automatic, semi-automatic and/or manual modes.

The computing platform 650 may control the functions of the vehicle 600 based on inputs received from various subsystems (such as the driving system 640, the perception system 620 and the decision control system 630). For instance, the computing platform 650 may use the inputs from the decision control system 630 to control the steering system 633, so as to avoid obstacles detected by the perception system 620. In some examples, the computing platform 650 may operate to provide control for many aspects of the vehicle 600 and its subsystems.

In an example, one or more of these above components may be separately mounted or associated with the vehicle 600. For instance, the memory 652 may exist partially or completely separate from the vehicle 600. The above components may be communicatively coupled together in a wired and/or wireless manner.

In an example, the above component is merely an instance, in practical applications, the components in the above modules may be added or deleted according to actual needs, and FIG. 12 is not to be understood as a limitation on the examples of the disclosure.

An automatic drive vehicle traveling on a road, such as the above vehicle 600, may recognize objects in its surrounding environment to determine the adjustment of the current speed. The objects may be other vehicles, traffic control devices or other types of objects. In some instances, each recognized object may be considered independently, and based on the self-characteristics of the objects, such as its current speed, acceleration, and distance from the vehicle, it may be used to determine the speed to be adjusted for the automatic drive vehicle.

In an example, the vehicle 600 or a perception and computing device (such as the computing system 631 and the computing platform 650) associated with the vehicle 600 may predict the behavior of the recognized objects based on the characteristics of the recognized objects and the state of the surrounding environment (traffic, rain, ice on the road, etc.). In an example, each recognized object depends on the behavior of each other, hence all the recognized objects may further be considered together to predict the behavior of a single recognized object. The vehicle 600 may adjust its speed based on the predicted behavior of the recognized objects. In other words, the automatic drive vehicle may determine which stable state the vehicle will need to adjust to (such as acceleration, deceleration or stop) based on the predicted behavior of the objects. In this process, other factors may also be considered to determine the speed of the vehicle 600, a lateral location of the vehicle 600 on the road, a curvature of the road, a proximity of static and dynamic objects, etc.

In addition to providing the instruction to adjust the speed of the automatic drive vehicle, the computing device may further provide an instruction to modify a steering angle of the vehicle 600, such that the automatic drive vehicle follows a given trajectory and/or maintains a safe lateral and vertical distance from objects near the automatic drive vehicle (such as vehicles in adjacent lanes on the road).

The above vehicle 600 may be various types of driving tools, cars, trucks, motorcycles, buses, boats, aircrafts, helicopters, recreational vehicles, trains, etc., which is not specifically limited in the examples of the disclosure.

In another example, a computer program product is further provided. The computer program product contains a computer program executable by a programmable apparatus. The computer program has a code part which is configured to, when executed by the programmable apparatus, execute the above method for generating the lane line.

Other examples of the disclosure will be apparent to those skilled in the art from consideration of the specification and practice of the disclosure. The disclosure is intended to cover any variations, uses, or adaptations of the disclosure following the general principles of the disclosure and including the common general knowledge or frequently used technical means in the technical field not disclosed in the disclosure. It is intended that the specification and examples be considered as examples merely, with a true scope and spirit of the disclosure being indicated by the following claims.

It will be appreciated that the disclosure is not limited to the exact construction that has been described above and illustrated in the accompanying drawings, and that various modifications and changes may be made without departing from its scope. It is intended that the scope of the disclosure merely be limited by the appended claims.

According to a first aspect of the example of the disclosure, a method for generating a lane line is provided, and includes:

acquiring three-dimensional point cloud data and two-dimensional lane line data of a target lane, where the two-dimensional lane line data is lane line data collected in response to determining that a vehicle is driving in the target lane, and the three-dimensional point cloud data is point cloud data of a surrounding environment of the vehicle collected in response to determining that the vehicle is driving in the target lane;

determining a plurality of lane line key points according to the two-dimensional lane line data and the three-dimensional point cloud data; and obtaining a target three-dimensional lane line by connecting the plurality of lane line key points randomly for many times according to attribute information of the plurality of lane line key points and a driving direction of the vehicle.

In an example, the attribute information includes a type and position information, and before obtaining the target three-dimensional lane line by connecting the plurality of lane line key points randomly for many times according to the attribute information of the plurality of lane line key points and the driving direction of the vehicle, the method further includes:

dividing the plurality of lane line key points into a plurality of key point sets according to the type and the position information of the plurality of lane line key points.

Obtaining the target three-dimensional lane line by connecting the plurality of lane line key points randomly for many times according to the attribute information of the plurality of lane line key points and the driving direction of the vehicle includes:

determining an adjacent key point set corresponding to each key point set; and obtaining the target three-dimensional lane line by connecting, as for each key point set, a plurality of lane line key points in the key point set with a plurality of lane line key points in the adjacent key point set randomly for many times.

In an example, obtaining the target three-dimensional lane line by connecting, as for each key point set, a plurality of lane line key points in the key point sets with a plurality of lane line key points in the adjacent key point sets randomly for many times includes:

determining an initial three-dimensional lane line;

taking the initial three-dimensional lane line as an undetermined three-dimensional lane line;

determining a cost value of the undetermined three-dimensional lane line; and executing a random connecting step circularly according to the undetermined three-dimensional lane line until an iteration number of the random connecting step is greater than or equal to a preset number threshold, or a difference between a cost value of a new undetermined three-dimensional lane line and a cost value of each target undetermined three-dimensional lane line is smaller than or equal to a preset difference threshold, so as to take the new undetermined three-dimensional lane line as the target three-dimensional lane line, where the target undetermined three-dimensional lane line includes a preset number of undetermined three-dimensional lane lines acquired before the new undetermined three-dimensional lane line.

The random connecting step includes:

obtaining a random three-dimensional lane line by exchanging, as for each key point set in the undetermined three-dimensional lane line, adjacent lane line key points corresponding to the key point sets randomly, where the adjacent lane line key points include lane line key points in the adjacent key point sets connected to lane line key points in the key point sets;

determining a cost value of the random three-dimensional lane line; and determining a new undetermined three-dimensional lane line from the random three-dimensional lane line and the undetermined three-dimensional lane line according to the cost value of the random three-dimensional lane line and the cost value of the undetermined three-dimensional lane line.

In an example, determining the initial three-dimensional lane line includes:

determining, as for each lane line key point in the key point sets, target adjacent lane line key points closest to the lane line key point from the adjacent key point sets, and obtaining the initial three-dimensional lane line by connecting the lane line key point with the target adjacent lane line key points.

In an example, determining the cost value of the undetermined three-dimensional lane line includes:

determining, as for each lane line key point of the undetermined three-dimensional lane line, key point cost value of the lane line key point; and taking a sum value of the plurality of key point cost values as the cost value of the undetermined three-dimensional lane line.

In an example, the attribute information further includes a direction, and determining the key point cost value of the lane line key point includes:

determining a direction cost value of the lane line key point according to the direction of the lane line key point and a direction of the adjacent lane line key point in the undetermined three-dimensional lane line connected to the lane line key point;

determining a type cost value of the lane line key point according to a type of the lane line key point and a type of the adjacent lane line key point;

determining an included angle cost value of the lane line key point according to the driving direction of the vehicle and a preset reference direction;

determining a number of intermittent lane line key points in the undetermined three-dimensional lane line; and calculating the key point cost values according to a preset direction coefficient, a preset type coefficient, a preset included angle coefficient, a preset number coefficient, the direction cost value, the type cost value, the included angle cost value and the number.

In an example, determining a new undetermined three-dimensional lane line from the random three-dimensional lane line and the undetermined three-dimensional lane line according to the cost value of the random three-dimensional lane line and the cost value of the undetermined three-dimensional lane line includes:

taking the random three-dimensional lane line as the new undetermined three-dimensional lane line in a case that the cost value of the random three-dimensional lane line is smaller than or equal to the cost value of the undetermined three-dimensional lane line; and determining a cost value difference between the cost value of the random three-dimensional lane line and the cost value of the undetermined three-dimensional lane line in a case that the cost value of the random three-dimensional lane line is greater than the cost value of the undetermined three-dimensional lane line, and determining the new undetermined three-dimensional lane line from the random three-dimensional lane line and the undetermined three-dimensional lane line according to the cost value difference and the iteration number.

In an example, determining the new undetermined three-dimensional lane line from the random three-dimensional lane line and the undetermined three-dimensional lane line according to the cost value difference and the iteration number includes:

determining an acceptance coefficient according to the iteration number and a preset initial cost value;

determining an acceptance probability according to the cost value difference and the acceptance coefficient;

taking the random three-dimensional lane line as the new undetermined three-dimensional lane line in a case that the acceptance probability is greater than or equal to a preset probability threshold; and taking the undetermined three-dimensional lane line as the new undetermined three-dimensional lane line in a case that the acceptance probability is smaller than the preset probability threshold.

In an example, before dividing the plurality of lane line key points into the plurality of key point sets according to the type and the position information of the plurality of lane line key points, the method further includes:

determining a plurality of initial lane line key points from the plurality of lane line key points; and obtaining a plurality of undetermined lane line key points by filtering out lane line key points that are the same type as the initial lane line key points, and whose distance from the initial lane line key points is not a preset distance threshold, where the preset distance threshold is an integral multiple of a preset distance.

Dividing the plurality of lane line key points into the plurality of key point sets according to the type and the position information of the plurality of lane line key points includes:

dividing the plurality of undetermined lane line key points into the plurality of key point sets according to a type and position information of the plurality of undetermined lane line key points.

According to a second aspect of the example of the disclosure, an apparatus for generating a lane line is provided, and includes:

a data acquiring module, configured to acquire three-dimensional point cloud data and two-dimensional lane line data of a target lane, where the two-dimensional lane line data is lane line data collected in response to determining that a vehicle is driving in the target lane, and the three-dimensional point cloud data is point cloud data of a surrounding environment of the vehicle collected in response to determining that the vehicle is driving in the target lane;

a first determining module, configured to determine a plurality of lane line key points according to the two-dimensional lane line data and the three-dimensional point cloud data; and a lane line generating module, configured to obtain a target three-dimensional lane line by connecting the plurality of lane line key points randomly for many times according to attribute information of the plurality of lane line key points and a driving direction of the vehicle.

In an example, the attribute information includes a type and position information, and the apparatus further includes:

a set dividing module, configured to divide the plurality of lane line key points into a plurality of key point sets according to the type and the position information of the plurality of lane line key points.

The lane line generating module is further configured to:

determine an adjacent key point set corresponding to each key point set; and obtain the target three-dimensional lane line by connecting, as for each key point set, a plurality of lane line key points in the key point set with a plurality of lane line key points in the adjacent key point set randomly for many times.

In an example, the lane line generating module is further configured to:
  determine an initial three-dimensional lane line;
  take the initial three-dimensional lane line as an undetermined three-dimensional lane line;
  determine a cost value of the undetermined three-dimensional lane line; and
  execute a random connecting step circularly according to the undetermined three-dimensional lane line until an iteration number of the random connecting step is greater than or equal to a preset number threshold, or a difference between a cost value of a new undetermined three-dimensional lane line and a cost value of each target undetermined three-dimensional lane line is smaller than or equal to a preset difference threshold, so as to take the new undetermined three-dimensional lane line as the target three-dimensional lane line, where the target undetermined three-dimensional lane line includes a preset number of undetermined three-dimensional lane lines acquired before the new undetermined three-dimensional lane line.

The random connecting step includes:
  obtaining a random three-dimensional lane line by exchanging, as for each key point set in the undetermined three-dimensional lane line, adjacent lane line key points corresponding to the key point sets randomly, where the adjacent lane line key points include lane line key points in the adjacent key point sets connected to lane line key points in the key point sets;
  determining a cost value of the random three-dimensional lane line; and
  determining a new undetermined three-dimensional lane line from the random three-dimensional lane line and the undetermined three-dimensional lane line according to the cost value of the random three-dimensional lane line and the cost value of the undetermined three-dimensional lane line.

In an example, the lane line generating module is further configured to:
  determine, as for each lane line key point in the key point sets, target adjacent lane line key points closest to the lane line key point from the adjacent key point sets, and obtain the initial three-dimensional lane line by connecting the lane line key point with the target adjacent lane line key points.

In an example, the lane line generating module is further configured to:
  determine, as for each lane line key point of the undetermined three-dimensional lane line, key point cost value of the lane line key point; and
  take a sum value of the plurality of key point cost values as the cost value of the undetermined three-dimensional lane line.

In an example, the attribute information further includes a direction, and the lane line generating module is further configured to:
  determine a direction cost value of the lane line key point according to the direction of the lane line key point and a direction of the adjacent lane line key point in the undetermined three-dimensional lane line connected to the lane line key point;
  determine a type cost value of the lane line key point according to a type of the lane line key point and a type of the adjacent lane line key point;
  determine an included angle cost value of the lane line key point according to the driving direction of the vehicle and a preset reference direction;
  determine a number of intermittent lane line key points in the undetermined three-dimensional lane line; and
  calculate the key point cost values according to a preset direction coefficient, a preset type coefficient, a preset included angle coefficient, a preset number coefficient, the direction cost value, the type cost value, the included angle cost value and the number.

In an example, the lane line generating module is further configured to:
  take the random three-dimensional lane line as the new undetermined three-dimensional lane line in a case that the cost value of the random three-dimensional lane line is smaller than or equal to the cost value of the undetermined three-dimensional lane line; and
  determine a cost value difference between the cost value of the random three-dimensional lane line and the cost value of the undetermined three-dimensional lane line in a case that the cost value of the random three-dimensional lane line is greater than the cost value of the undetermined three-dimensional lane line, and determine the new undetermined three-dimensional lane line from the random three-dimensional lane line and the undetermined three-dimensional lane line according to the cost value difference and the iteration number.

In an example, the lane line generating module is further configured to:
  determine an acceptance coefficient according to the iteration number and a preset initial cost value;
  determine an acceptance probability according to the cost value difference and the acceptance coefficient;
  take the random three-dimensional lane line as the new undetermined three-dimensional lane line in a case that the acceptance probability is greater than or equal to a preset probability threshold; and
  take the undetermined three-dimensional lane line as the new undetermined three-dimensional lane line in a case that the acceptance probability is smaller than the preset probability threshold.

In an example, the apparatus further includes:
  a second determining module, configured to determine a plurality of initial lane line key points from the plurality of lane line key points; and
  a filtering-out module, configured to obtain a plurality of undetermined lane line key points by filtering out lane line key points that are the same type as the initial lane line key points, and whose distance from the initial lane line key points is not a preset distance threshold, where the preset distance threshold is an integral multiple of a preset distance.

The set dividing module is further configured to:
  divide the plurality of undetermined lane line key points into the plurality of key point sets according to a type and position information of the plurality of undetermined lane line key points.

According to a third aspect of the example of the disclosure, a vehicle is provided, and includes:
  a processor, and
  a memory, configured to store processor-executable instructions.

The processor is configured to acquire three-dimensional point cloud data and two-dimensional lane line data of a target lane, where the two-dimensional lane line data is lane line data collected in response to determining that the vehicle is driving in the target lane, and the three-dimensional point cloud data is point cloud data of a surrounding environment of the vehicle collected in response to determining that the vehicle is driving in the target lane; determine a plurality of lane line key points according to the two-dimensional lane line data and the three-dimensional point cloud data; and obtain a target three-dimensional lane line by connecting the plurality of lane line key points randomly for many times according to attribute information of the plurality of lane line key points and a driving direction of the vehicle.

According a fourth aspect of the example of the disclosure, a non-transitory computer-readable storage medium is provided and stores computer program instructions, and the program instructions, when executed by a processor, implement steps of the method for generating the lane line provided by the first aspect of the disclosure.

According to a fifth aspect of the example of the disclosure, a chip is provided, and includes a processor and an interface, and the processor is configured to read instructions, so as to execute the method for generating the lane line provided by the first aspect of the disclosure.

A technical solution provided by the examples of the disclosure may include the following beneficial effects: the three-dimensional point cloud data and the two-dimensional lane line data of the target lane are acquired, the two-dimensional lane line data is the lane line data collected in response to determining that the vehicle is driving in the target lane, and the three-dimensional point cloud data is the point cloud data of the surrounding environment of the vehicle collected in response to determining that the vehicle is driving in the target lane; the plurality of lane line key points are determined according to the two-dimensional lane line data and the three-dimensional point cloud data; and the target three-dimensional lane line is obtained by connecting the plurality of lane line key points randomly for many times according to the attribute information of the plurality of lane line key points and the driving direction of the vehicle. That is, in the disclosure, after determining the plurality of lane line key points, the attribute information of the lane line key points and the driving direction of the vehicle can be combined to obtain the target three-dimensional lane line. In this way, situations of broken line or wrong connection of the lane line can be reduced, so that an accuracy of the generated three-dimensional lane line is improved.

What is claimed is:

1. A method for controlling a vehicle that improves driving safety, the method comprising:
    acquiring, by a processor located in the vehicle, three-dimensional point cloud data and two-dimensional lane line data of a target lane on which the vehicle is traveling from a camera and a laser radar, wherein the two-dimensional lane line data is lane line data collected in response to determining that the vehicle is driving in the target lane, and the three-dimensional point cloud data is point cloud data of a surrounding environment of the vehicle collected in response to determining that the vehicle is driving in the target lane;
    determining, by the processor, a plurality of lane line key points according to the two-dimensional lane line data and the three-dimensional point cloud data;
    obtaining, by the processor, a target three-dimensional lane line by randomly connecting the plurality of lane line key points for more than one time according to attribute information of the plurality of lane line key points and a driving direction of the vehicle, wherein the attribute information comprises a type and position information of the plurality of lane line key points, and before obtaining the target three-dimensional lane line by randomly connecting the plurality of lane line key points for more than one time according to the attribute information of the plurality of lane line key points and the driving direction of the vehicle;
    dividing, by the processor, the plurality of lane line key points into a plurality of key point sets according to the type and the position information of the plurality of lane line key points;
    determining, by the processor, an adjacent key point set corresponding to each key point set;
    determining, by the processor, an initial three-dimensional lane line;
    taking, by the processor, the initial three-dimensional lane line as an undetermined three-dimensional lane line;
    determining, by the processor, a cost value of the undetermined three-dimensional lane line;
    iteratively executing, by the processor, a step of randomly connecting according to the undetermined three-dimensional lane line until an iteration number of the step of randomly connecting is greater than or equal to a preset number threshold, or a difference between a cost value of a new undetermined three-dimensional lane line and a cost value of a target undetermined three-dimensional lane line is smaller than or equal to a preset difference threshold, so as to take the new undetermined three-dimensional lane line as the target three-dimensional lane line, wherein the target undetermined three-dimensional lane line comprises a preset number of undetermined three-dimensional lane lines acquired before the new undetermined three-dimensional lane line; and
    controlling, by the processor, the vehicle based on the target three-dimensional lane line,
    wherein the randomly connecting comprises:
        obtaining a random three-dimensional lane line by randomly exchanging, as for each key point set in the undetermined three-dimensional lane line, adjacent lane line key points corresponding to the key point sets, wherein the adjacent lane line key points comprise lane line key points in the adjacent key point sets connected to lane line key points in the key point sets;
        determining a cost value of the random three-dimensional lane line; and
        determining the new undetermined three-dimensional lane line from the random three-dimensional lane line and the undetermined three-dimensional lane line according to the cost value of the random three-dimensional lane line and the cost value of the undetermined three-dimensional lane line.

2. The method according to claim 1, wherein determining the initial three-dimensional lane line comprises:
    determining, by the processor, as for each lane line key point in the key point sets, target adjacent lane line key points closest to the lane line key point from the adjacent key point sets, and obtaining the initial three-dimensional lane line by connecting the lane line key point with the target adjacent lane line key points.

3. The method according to claim 1, wherein determining the cost value of the undetermined three-dimensional lane line comprises:
    determining, by the processor, as for each lane line key point of the undetermined three-dimensional lane line, key point cost value of the lane line key point; and
    taking, by the processor, a sum value of the plurality of key point cost values as the cost value of the undetermined three-dimensional lane line.

4. The method according to claim 3, wherein the attribute information further comprises a direction of the lane line key point, a direction of the adjacent lane line key point in the undetermined three-dimensional lane line connected to the lane line key point and a type of the adjacent lane line key point, and determining the key point cost value of the lane line key point comprises:

determining, by the processor, a direction cost value of the lane line key point according to the direction of the lane line key point and the direction of the adjacent lane line key point in the undetermined three-dimensional lane line connected to the lane line key point;

determining, by the processor, a type cost value of the lane line key point according to the type of the lane line key point and the type of the adjacent lane line key point;

determining, by the processor, an included angle cost value of the lane line key point according to the driving direction of the vehicle and a preset reference direction;

determining, by the processor, a number of intermittent lane line key points in the undetermined three-dimensional lane line; and calculating, by the processor, the key point cost values according to a preset direction coefficient, a preset type coefficient, a preset included angle coefficient, a preset number coefficient, the direction cost value, the type cost value, the included angle cost value and the number of intermittent lane line key points in the undetermined three-dimensional lane line.

5. The method according to claim 1, wherein determining the new undetermined three-dimensional lane line from the random three-dimensional lane line and the undetermined three-dimensional lane line according to the cost value of the random three-dimensional lane line and the cost value of the undetermined three-dimensional lane line comprises:

taking, by the processor, the random three-dimensional lane line as the new undetermined three-dimensional lane line in a case that the cost value of the random three-dimensional lane line is smaller than or equal to the cost value of the undetermined three-dimensional lane line; and determining, by the processor, a cost value difference between the cost value of the random three-dimensional lane line and the cost value of the undetermined three-dimensional lane line in a case that the cost value of the random three-dimensional lane line is greater than the cost value of the undetermined three-dimensional lane line, and determining, by the processor, the new undetermined three-dimensional lane line from the random three-dimensional lane line and the undetermined three-dimensional lane line according to the cost value difference and the iteration number.

6. The method according to claim 5, wherein determining the new undetermined three-dimensional lane line from the random three-dimensional lane line and the undetermined three-dimensional lane line according to the cost value difference and the iteration number comprises:

determining, by the processor, an acceptance coefficient according to the iteration number and a preset initial cost value;

determining, by the processor, an acceptance probability according to the cost value difference and the acceptance coefficient;

taking, by the processor, the random three-dimensional lane line as the new undetermined three-dimensional lane line in a case that the acceptance probability is greater than or equal to a preset probability threshold; and taking, by the processor, the undetermined three-dimensional lane line as the new undetermined three-dimensional lane line in a case that the acceptance probability is smaller than the preset probability threshold.

7. The method according to claim 1, wherein before dividing the plurality of lane line key points into the plurality of key point sets according to the type and the position information of the plurality of lane line key points, the method further comprises:

determining, by the processor, a plurality of initial lane line key points from the plurality of lane line key points; and obtaining, by the processor, a plurality of undetermined lane line key points by filtering out lane line key points that are the same type as the initial lane line key points, and whose distance from the initial lane line key points is not a preset distance threshold, wherein the preset distance threshold is an integral multiple of a preset distance; and dividing, by the processor, the plurality of lane line key points into the plurality of key point sets according to the type and the position information of the plurality of lane line key points comprises:

dividing, by the processor, the plurality of undetermined lane line key points into the plurality of key point sets according to a type of the plurality of undetermined lane line key points and position information of the plurality of undetermined lane line key points.

8. A vehicle, comprising:

a camera;

a laser radar;

a memory; and one or more processors that are communicatively coupled to the camera, the laser radar and the memory, wherein the one or more processors are collectively configured to:

acquire, using the camera and the laser radar, three-dimensional point cloud data and two-dimensional lane line data of a target lane on which the vehicle is traveling, wherein the two-dimensional lane line data is lane line data collected in response to determining that the vehicle is driving in the target lane, and the three-dimensional point cloud data is point cloud data of a surrounding environment of the vehicle collected in response to determining that the vehicle is driving in the target lane;

determine a plurality of lane line key points according to the two-dimensional lane line data and the three-dimensional point cloud data; and obtain a target three-dimensional lane line by randomly connecting the plurality of lane line key points for more than one time according to attribute information of the plurality of lane line key points and a driving direction of the vehicle, wherein the attribute information comprises a type and position information of the plurality of lane line key points, and before obtaining the target three-dimensional lane line by randomly connecting the plurality of lane line key points for more than one time according to the attribute information of the plurality of lane line key points and the driving direction of the vehicle;

divide the plurality of lane line key points into a plurality of key point sets according to the type and the position information of the plurality of lane line key points;

determine an adjacent key point set corresponding to each key point set;

determine an initial three-dimensional lane line;

take the initial three-dimensional lane line as an undetermined three-dimensional lane line;

determine a cost value of the undetermined three-dimensional lane line;
iteratively execute a step of randomly connecting according to the undetermined three-dimensional lane line until an iteration number of the step of randomly connecting is greater than or equal to a preset number threshold, or a difference between a cost value of a new undetermined three-dimensional lane line and a cost value of a target undetermined three-dimensional lane line is smaller than or equal to a preset difference threshold, so as to take the new undetermined three-dimensional lane line as the target three-dimensional lane line, wherein the target undetermined three-dimensional lane line comprises a preset number of undetermined three-dimensional lane lines acquired before the new undetermined three-dimensional lane line; and
control the vehicle based on the target three-dimensional lane line,
wherein the randomly connecting comprises:
obtaining a random three-dimensional lane line by randomly exchanging, as for each key point set in the undetermined three-dimensional lane line, adjacent lane line key points corresponding to the key point sets, wherein the adjacent lane line key points comprise lane line key points in the adjacent key point sets connected to lane line key points in the key point sets;
determining a cost value of the random three-dimensional lane line; and
determining the new undetermined three-dimensional lane line from the random three-dimensional lane line and the undetermined three-dimensional lane line according to the cost value of the random three-dimensional lane line and the cost value of the undetermined three-dimensional lane line.

9. The vehicle according to claim 8, wherein the one or more processors are further collectively configured to:
determine, as for each lane line key point in the key point sets, target adjacent lane line key points closest to the lane line key point from the adjacent key point sets, and obtain the initial three-dimensional lane line by connecting the lane line key point with the target adjacent lane line key points.

10. The vehicle according to claim 8, wherein the one or more processors are further collectively configured to:
determine, as for each lane line key point of the undetermined three-dimensional lane line, key point cost value of the lane line key point; and
take a sum value of the plurality of key point cost values as the cost value of the undetermined three-dimensional lane line.

11. The vehicle according to claim 10, wherein the attribute information further comprises a direction of the lane line key point, a direction of the adjacent lane line key point in the undetermined three-dimensional lane line connected to the lane line key point and a type of the adjacent lane line key point, and the one or more processors are further collectively configured to:
determine a direction cost value of the lane line key point according to the direction of the lane line key point and the direction of the adjacent lane line key point in the undetermined three-dimensional lane line connected to the lane line key point;
determine a type cost value of the lane line key point according to the type of the lane line key point and the type of the adjacent lane line key point;

determine an included angle cost value of the lane line key point according to the driving direction of the vehicle and a preset reference direction;
determine a number of intermittent lane line key points in the undetermined three-dimensional lane line; and
calculate the key point cost values according to a preset direction coefficient, a preset type coefficient, a preset included angle coefficient, a preset number coefficient, the direction cost value, the type cost value, the included angle cost value and the number of intermittent lane line key points in the undetermined three-dimensional lane line.

12. The vehicle according to claim 8, wherein the one or more processors are further collectively configured to:
take the random three-dimensional lane line as the new undetermined three-dimensional lane line in a case that the cost value of the random three-dimensional lane line is smaller than or equal to the cost value of the undetermined three-dimensional lane line; and
determine a cost value difference between the cost value of the random three-dimensional lane line and the cost value of the undetermined three-dimensional lane line in a case that the cost value of the random three-dimensional lane line is greater than the cost value of the undetermined three-dimensional lane line, and determine the new undetermined three-dimensional lane line from the random three-dimensional lane line and the undetermined three-dimensional lane line according to the cost value difference and the iteration number.

13. The vehicle according to claim 12, wherein the one or more processors are further collectively configured to:
determine an acceptance coefficient according to the iteration number and a preset initial cost value;
determine an acceptance probability according to the cost value difference and the acceptance coefficient;
take the random three-dimensional lane line as the new undetermined three-dimensional lane line in a case that the acceptance probability is greater than or equal to a preset probability threshold; and
take the undetermined three-dimensional lane line as the new undetermined three-dimensional lane line in a case that the acceptance probability is smaller than the preset probability threshold.

14. The vehicle according to claim 8, wherein the one or more processors are further collectively configured to:
determine a plurality of initial lane line key points from the plurality of lane line key points; and
obtain a plurality of undetermined lane line key points by filtering out lane line key points that are the same type as the initial lane line key points, and whose distance from the initial lane line key points is not a preset distance threshold, wherein the preset distance threshold is an integral multiple of a preset distance; and
divide the plurality of undetermined lane line key points into the plurality of key point sets according to a type of the plurality of undetermined lane line key points and position information of the plurality of undetermined lane line key points.

15. A non-transitory computer-readable storage medium storing instructions for controlling a vehicle that improves driving safety, the instructions executed by a processor of the vehicle, cause the vehicle to execute a method comprising:
acquiring three-dimensional point cloud data and two-dimensional lane line data of a target lane on which the vehicle is traveling from a camera and a laser radar, wherein the two-dimensional lane line data is lane line data collected in response to determining that the vehicle is driving in the target lane, and the three-dimensional point cloud data is point cloud data of a surrounding environment of the vehicle collected in response to determining that the vehicle is driving in the target lane;

determining, a plurality of lane line key points according to the two-dimensional lane line data and the three-dimensional point cloud data;

obtaining, a target three-dimensional lane line by randomly connecting the plurality of lane line key points for more than one time according to attribute information of the plurality of lane line key points and a driving direction of the vehicle; wherein the attribute information comprises a type and position information of the plurality of lane line key points, and before obtaining the target three-dimensional lane line by randomly connecting the plurality of lane line key points for more than one time according to the attribute information of the plurality of lane line key points and the driving direction of the vehicle;

dividing, by the processor, the plurality of lane line key points into a plurality of key point sets according to the type and the position information of the plurality of lane line key points;

determining, by the processor, an adjacent key point set corresponding to each key point set;

determining, by the processor, an initial three-dimensional lane line;

taking, by the processor, the initial three-dimensional lane line as an undetermined three-dimensional lane line;

determining, by the processor, a cost value of the undetermined three-dimensional lane line;

iteratively executing, by the processor, a step of randomly connecting according to the undetermined three-dimensional lane line until an iteration number of the step of randomly connecting is greater than or equal to a preset number threshold, or a difference between a cost value of a new undetermined three-dimensional lane line and a cost value of a target undetermined three-dimensional lane line is smaller than or equal to a preset difference threshold, so as to take the new undetermined three-dimensional lane line as the target three-dimensional lane line, wherein the target undetermined three-dimensional lane line comprises a preset number of undetermined three-dimensional lane lines acquired before the new undetermined three-dimensional lane line; and controlling, by the processor, the vehicle based on the target three-dimensional lane line, wherein the randomly connecting comprises:
  obtaining a random three-dimensional lane line by randomly exchanging, as for each key point set in the undetermined three-dimensional lane line, adjacent lane line key points corresponding to the key point sets, wherein the adjacent lane line key points comprise lane line key points in the adjacent key point sets connected to lane line key points in the key point sets;
  determining a cost value of the random three-dimensional lane line; and
  determining the new undetermined three-dimensional lane line from the random three-dimensional lane line and the undetermined three-dimensional lane line according to the cost value of the random three-dimensional lane line and the cost value of the undetermined three-dimensional lane line.

16. A chip, comprising:
one or more processors; and
an interface that communicatively couples the chip to a camera and a laser radar located in a vehicle,
wherein the one or more processors are collectively configured to perform the method according to claim 1.

* * * * *

UNITED STATES PATENT AND TRADEMARK OFFICE
CERTIFICATE OF CORRECTION

| | | |
|---|---|---|
| PATENT NO. | : 12,394,218 B2 | Page 1 of 1 |
| APPLICATION NO. | : 17/990712 | |
| DATED | : August 19, 2025 | |
| INVENTOR(S) | : Kun Yu | |

It is certified that error appears in the above-identified patent and that said Letters Patent is hereby corrected as shown below:

In the Specification
In Column 1, Line 57, delete "processor," and insert -- processor; --, therefor.
In Column 5, Line 42, delete "distance, . . ." and insert -- distance, . . ., --, therefor.
In Column 9, Line 24, delete "probability." and insert -- probability, --, therefor.
In Column 22, Line 58, delete "a processor, and" and insert -- a processor; and --, therefor.
In Column 2, Line 8, delete "According" and insert -- According to --, therefor.
In Column 15, Line 57, delete "graphic process unit" and insert -- graphics processing unit --, therefor.
In Column 23, Line 9, delete "According a" and insert -- According to a --, therefor.

Signed and Sealed this
Twenty-eighth Day of October, 2025

John A. Squires
*Director of the United States Patent and Trademark Office*